US007298240B2

(12) United States Patent
Lamar

(10) Patent No.: US 7,298,240 B2
(45) Date of Patent: Nov. 20, 2007

(54) ELECTRONICALLY ENABLING DEVICES REMOTELY

(76) Inventor: David Lamar, 1430 Highland View Ct., Los Altos, CA (US) 94024

(*) Notice: Subject to any disclaimer, the term of this patent is extended or adjusted under 35 U.S.C. 154(b) by 101 days.

(21) Appl. No.: 10/906,807

(22) Filed: Mar. 8, 2005

(65) Prior Publication Data

US 2006/0071753 A1 Apr. 6, 2006

Related U.S. Application Data

(60) Provisional application No. 60/612,399, filed on Sep. 24, 2004.

(51) Int. Cl.
*G05B 19/00* (2006.01)

(52) U.S. Cl. ............... 340/5.6; 340/572.1; 340/539.13; 340/5.1; 340/5.2; 340/5.22; 340/5.23; 340/5.61; 340/5.64; 340/5.62

(58) Field of Classification Search ................ 340/5.6, 340/825.69, 825.72, 572.1, 539.13, 5.1, 5.2, 340/5.22, 5.23, 5.61, 5.64, 5.62
See application file for complete search history.

(56) References Cited

U.S. PATENT DOCUMENTS 6,005,489 A * 12/1999 Siegle et al. ........... 340/825.69
6,058,815 A * 5/2000 Habermehl .................. 81/434
6,469,615 B1 * 10/2002 Kady et al. .................. 340/5.1
6,834,730 B2 * 12/2004 Gass et al. ...................... 173/2
7,054,696 B2 * 5/2006 Crowell ....................... 700/83
2003/0016828 A1 * 1/2003 Bunte et al. ................ 380/278
2003/0102970 A1 * 6/2003 Creel et al. .............. 340/568.1
2004/0108120 A1 6/2004 Wiesner et al. ................ 173/2
2005/0128083 A1 * 6/2005 Puzio et al. ............. 340/572.1

FOREIGN PATENT DOCUMENTS

CA 2283552 10/2001

* cited by examiner

*Primary Examiner*—Brian Zimmerman
*Assistant Examiner*—Vernal Brown
(74) *Attorney, Agent, or Firm*—David Lewis; Richard D. Fuerle

(57) ABSTRACT

A device has (1) an electronic key that transmits a wireless coded signal and (2) at least one tool that can receive that signal. The coded signal is compared to a coded signal stored in said tool. If the coded signal matches the stored signal, a switch is closed for a predetermined amount of time. An on/off switch then enables the user of the tool to turn the tool on and off during the predetermined amount of time. After the predetermined amount of time, the switch is opened so that the tool can no longer be used. Opening the switch may be delayed if the tool is in use. The tool may also contain a unique identification code that can be read by various electronic means to identify the tool.

26 Claims, 5 Drawing Sheets

ELECTRONICALLY ENABLING DEVICES REMOTELY

CROSS-REFERENCE TO RELATED APPLICATION

This application claims priority from U.S. Provisional Application No. 60/612,399, filed Sep. 24, 2004.

BACKGROUND OF THE INVENTION

This invention relates to a device that is remotely enabled and disabled. In particular, it relates to a device that is unlocked remotely by means of an electronic key for a predetermined period of time, after which the device is automatically disabled.

Easily carried, but expensive devices, such as digital cameras, video cameras, laptop computers, electronic instruments, and power tools, are very tempting to thieves. Currently, there is no effective, easy-to-use method of protecting such devices from theft. For example, while cell phones have a built-in electronic combination lock that prevents calls when activated, virtually no one uses it because the procedure for activating and deactivating it is cumbersome and time-consuming.

In addition to thieves, devices may also be vulnerable to use by unauthorized persons, such as people who have not been trained to use the device properly or small children. For example, a child who thinks he can use the family's lawn mower, hedge trimmer, or table saw without training may inflict serious bodily injury to himself or others or damage property. While smaller tools can be locked away to prevent unauthorized usage, that may not be possible for larger tools.

It is common practice to place unique identification, such as an alphanumeric serial number, on devices so that if a device is stolen and recovered it can be identified and claimed. The owner of a device can also keep a record of the serial number of the device or register it with its manufacturer. However, identification can be removed or adulterated and registration requires the manufacturer to maintain a list that links the owner's name to that serial number. It is both time consuming and difficult to find rightful owners of stolen property and, unless the property has a high value, the cost of recovering it may exceed its value.

Previous inventions, such as U.S. Pat. No. 6,005,489, have tried to eliminate battery operated tool theft from a predetermined and fixed work area by using a fixed transmitter that sent out an enable code to all the tools within signal range. When a battery is inserted into the tool, the tool is enabled until the battery is either drained or removed. Although that invention may operate successfully for a fixed work area, it is not intended to be a solution that could be applied to a wide range of different devices.

German patent DE10630766/US2004/0108120A1 implemented a remote keyless entry (RKE) system for tools. This approach is most commonly used as a method of locking and unlocking a passenger vehicle by means of a small electronic transmitter. As soon as the tool is unpowered, it would need to be reauthorized in order to function. In an industrial construction site, this simply isn't an acceptable solution as it requires the operator to carry the key with him and it provides more of an effort rather than a value, analogous to the cell phone example cited hereinabove. It lacks the needed utility to be acceptable to users.

Canadian patent CA02283552 tried to address the problem of portable tool theft by putting a keypad and an LCD display on the tool. The owner inserts a particular unlock code on the keypad and the tool functions until the power is removed. Again, this is not a practical solution as tools receive rough handling and a keypad and display simply would not last.

SUMMARY OF THE INVENTION

The object of this invention is to provide a device that can be enabled for a predetermined period of time by means of an electronic key.

A coded signal is transmitted from the electronic key to a receiver within the device and, if the code is authenticated, the device is enabled and can be operated; unauthorized codes are ignored.

Once enabled, the device will operate for only the specified time period. The enabled time period would be set by the manufacturer or user for the device. After the expiration of the time period, the device could not be operated without re-enabling it by means of the electronic key.

If the device has a manually operable on-off switch, such as on a digital camera, the user can turn the device on and off as needed without affecting the timing circuit.

If the enabled time period concludes while the user is in the middle of an operation, the disabling of the device can be delayed. This permits a digital camera to complete the processing of an image into memory or a tool in the middle of drilling a hole to complete the task.

If the device is stolen, it would have little value since it will not operate. The lack of an electronic key to enable the device would be a sure sign that it was stolen and acts as a deterrence to both the thief and potential buyer.

Even if the power source is removed, the device will retain its enabled state for a specified duration. This permits moving an AC powered device, changing the battery, or other user activity.

If the use of the apparatus is completed before the disable time period is reached, the user can manually disable the apparatus by sending a disable signal via the "off" button on the electronic key. The enabled or disabled status of the apparatus can optionally be presented audibly and/or visually such as through the use of a display, LED(s), or a speaker on the apparatus. For example, a green-lit LED could indicate an enabled status while a blinking red LED could indicate 15 minutes left before the apparatus is disabled and an unlit LED could indicate a disabled status. A series of informational or warning beeps could also be used to convey the information.

The apparatus control circuit would contain a unique identifier matched to the electronic key thus permitting only the correct identifier match to activate the device. This will reduce theft since stealing the device without possessing the correct electronic key will make the item inoperable and valueless and readily identifiable as stolen.

The control circuit in the device may contain a unique identification code and have a means of communicating that identification code to an authorized identification device, which could be part of the electronic key. This permits the identification of the device's owner so that it can be returned if it is lost or stolen.

The apparatus according to the present invention will also prevent unauthorized users from operating the device even when it has not been stolen. This is the most likely case with children or work environments where many devices may be accessible but where restricted operation is needed.

The device may include an optional electronic combination lock so that, should the user forget his electronic key, he can enter enable the device by entering a code on the combination lock with a sequence of key presses on a series of switches rather than a traditional keypad. The results can be shown on a visual indicator, such as a display. With the correct activation code, the device unlocks as if an enabling signal from the electronic key was received. After a successful key press activation sequence, the enabling key press activation sequence could remain unchanged or be modified based on security requirements. There are many electronic combination lock implementation options to suit the particular device design requirements.

In addition to controlling the enabling and disabling of a device, the timing circuit could have the means to optionally control the operation of the device based on the date and time of day rather than simply a set time duration from an activation sequence. For example, an authorized user can program a tool to activate at 8 AM and deactivate at 6 PM. This can be accomplished prior to the time of use to add flexibility The electronic key could be reconfigured to operate multiple electronically controlled devices in different locations. This reconfiguration would permit one operator to control a number of devices with the use of a single electronic key, rather than having to use multiple individual electronic keys.

The reconfiguration of an electronic key is possible either by ordering the desired combination in a new electronic key from the manufacturer or by reconfiguring the key by logging into a secure database containing all of the key information via a network and specifying the specific device that a particular electronic key would control. Optionally, the electronic key function could be combined with other electronic keys, such as an automobile electronic key, in a single key.

An alternative to wireless communications would include a means of device control via a wired connection. Communications could be transmitted via AC power wiring permitting the control operator to set the parameters in the device.

With the development and standardization of ad hoc wireless networking now taking place, the device could optionally have the means of communication with such a network. These new network topologies, such as Star or Mesh and combinations thereof, have no central orchestrating device. Instead, each network node has the means of identifying itself and acting as a relay point for other network nodes. This means of communication permits the device to fix its location within such networks and allow for reprogramming of its function by remote authorized users.

DESCRIPTION OF THE PREFERRED EMBODIMENTS

Figure 1:
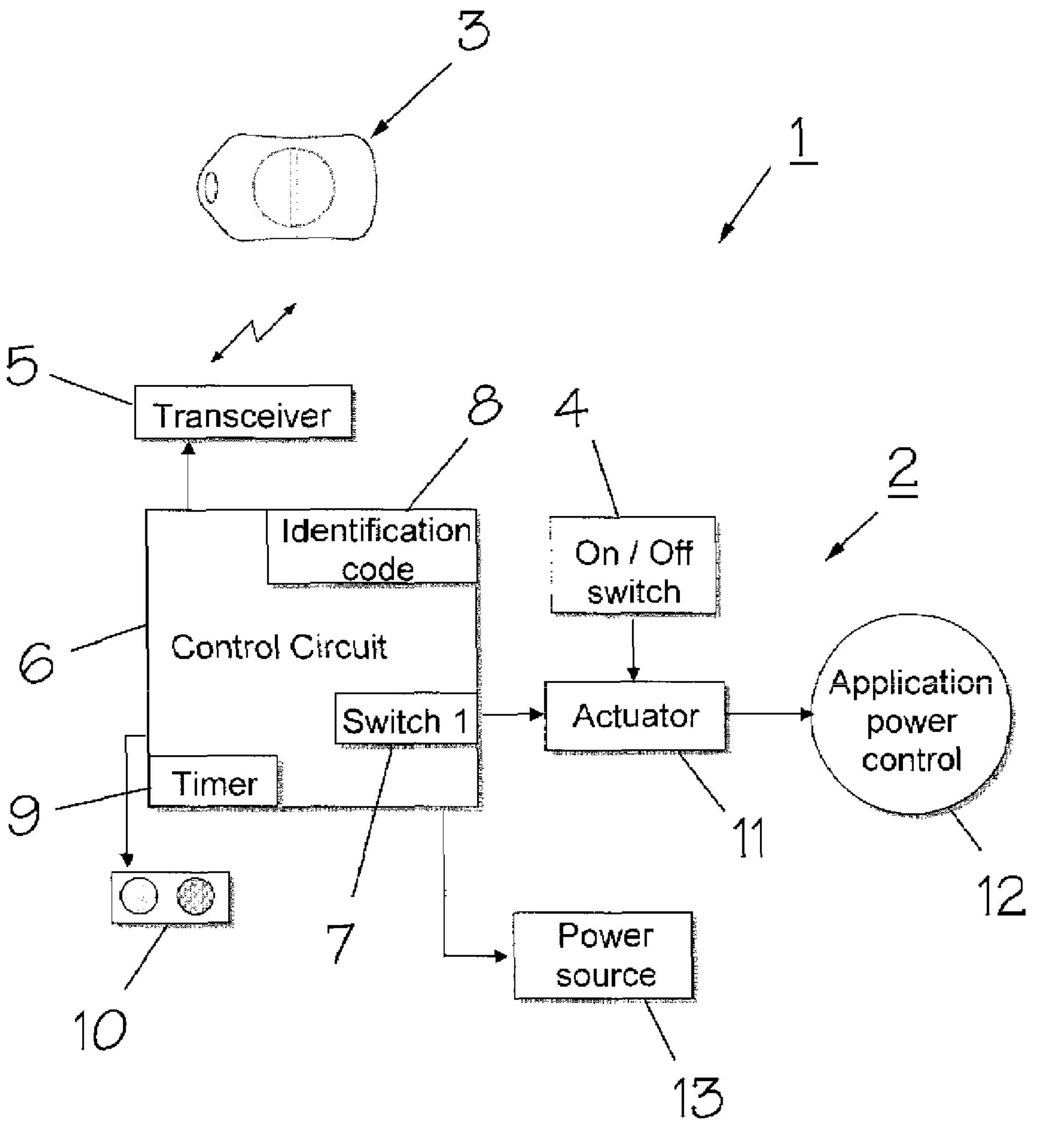
FIG. 1 is a diagrammatic view illustrating a certain presently preferred embodiment of a device according to this invention.

Referring to FIG. 1, a device 1 according to this invention comprises tool 2 and remote wireless electronic key 3 that can communicate with tool 2. Tool 2 may be a power tool, such as a drill or saw, a lawn mower, a digital camera, computer, digital music players, video cameras, digital projectors or video game player. It may be stationary or portable. When tool 2 is activated it can turn on an electric motor, gasoline engine, diesel engine, compressed air tool, chemical tool (e.g., a tool operated by firing blank ammunition), close an electric circuit, or another operation. Tool 2 has an on/off switch 4 that enables the operator of the tool to turn the tool on and off as it is needed. On/off switch 4 will typically close an electric circuit, but may also turn the tool on and off by other means. Tool 2 is further provided with a transceiver 5 that can send and receive coded wireless signals to and from electronic key 3. A control circuit 6 within tool 2 compares a coded electronic signal received from electronic key 3 to a coded signal stored within tool 2 and, if the coded signal matches the stored signal, closes locking switch 7. Locking switch 7 is in series with on/off switch 4, so on/off switch 4 is operable only if locking switch 7 is closed.

Electronic key 3 transmits a unique identification code 8 to transceiver 5 in tool 2. Once the identification code 8 is authenticated, timer 9 is activated for the desired time period. Control circuit 6 then turns on visual indicator 10, which gives a visual signal (an audible signal could also be used), indicating the command has been received. For example, a green LED (light emitting diode) may be blinked for a period of about 5 seconds. The sequence, duration, and annunciation of the signal may be determined by the manufacturer. Actuator 11 then turns on the application power control 12, thereby permitting the user to control the device's on/off switch 4 until the enabled time period has expired. A power source 13, such as a battery or AC current, provides power for the electronics and the device.

At the end of the time period specified by timer 9, tool 2 turns on visual indicator 10 (or annunciates an audible signal), indicating the time period has expired, and deactivates actuator 11, which disables tool 2. Alternatively, a time period, say one minute, could be programmed into the tool 2 so that prior to the expiration of the time period specified by timer 9, the visual indicator 10 illuminates a visual signal (or annunciates an audible signal) to indicate there is only one minute remaining before tool 2 is deactivated. This might be advisable for safety, performance, or user convenience purposes.

A second alternative could be that at the expiration of the time period specified by timer 9, tool 2, is not deactivated as long as on/off switch 4 is held in the "on" position by the user. This would allow the user to complete the task at hand and might be advisable for safety, performance, or user convenience purposes.

After tool 2 is enabled, and the user wishes to extend the operation cycle of tool 2 by resetting timer 9, the electronic key 3 can be used a second time. The operation of the tool 2 can be altered by having the electronic key 3 reprogram the operation of the tool 2. When tool 2 detects a unique sequence of electronic key signals from the electronic key signal 3, visual indicator 10 illuminates a visual signal (or annunciates an audible signal), for example flashing a green LED or providing a tone, to indicate it is now in a mode in which timer 9 can be reprogrammed. This time period for this mode would last for short time duration, such as about 30 seconds. This time period could be specified by the manufacturer of the apparatus based on market or customer requirements. If during this second time period, no further communication between electronic key 3 and control circuit 6 is received, tool 2 would exit this mode and resume normal operation for the remaining activation time period. If, during this 30-second interval, the user activates the electronic key 3 to communicate with control circuit 6, the duration of timer 9 or other control function would be adjusted based on the command sent to control circuit 6. The second time interval would then be reinitialized by the control circuit 6. Alternatively, electronic key 3 could transmit a command to the control circuit 6 to terminate this mode immediately.

Figure 5:
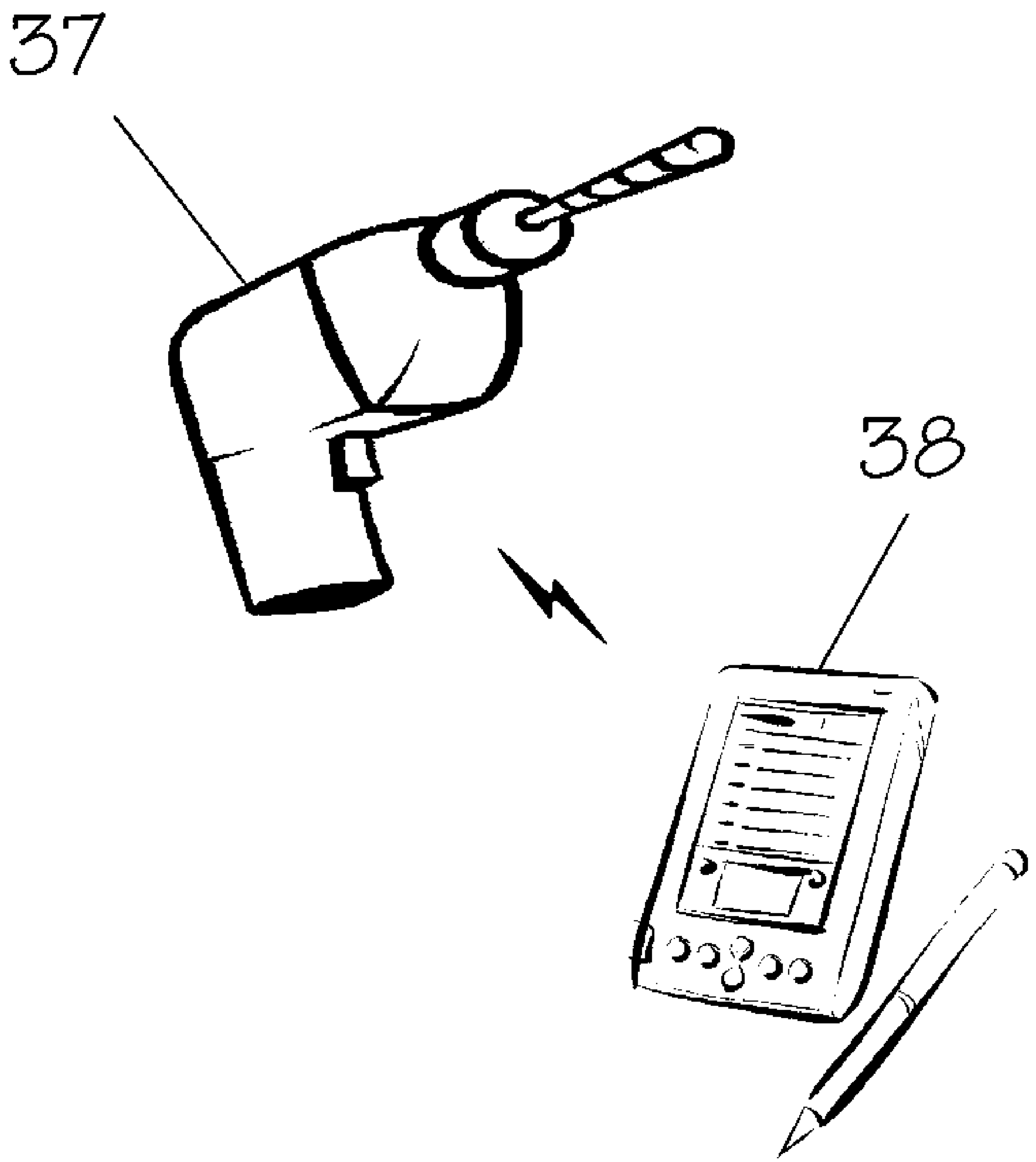
FIG. 5 is an illustration of communication between a personal digital assistant and a device.

In addition to sending "enable" and "disable" commands to the tool, the electronic key 3 may contain switches for sending a variety of other commands to the unit. For example, during the assembly of the apparatus, a single unique identification code 8 may be inserted into tool 2. In this way, the tool can be interrogated as to its unique identification code or all the tools within an area can be interrogated to determine if any of them has a particular code in order to locate it. Stolen tools that have been recovered can be interrogated to obtain their identification code, which can then be used to identify the owner. Referring to FIG. 5, a PDA (Personal Digital Assistant) 37 is a handheld device that combines computing, networking, and personal organizer features. Such an auxiliary device could possess the means of establishing authorized communications with the device 38 and retrieving the unique identification code. An auxiliary device could also perform the task via a network connection.

Figure 2:
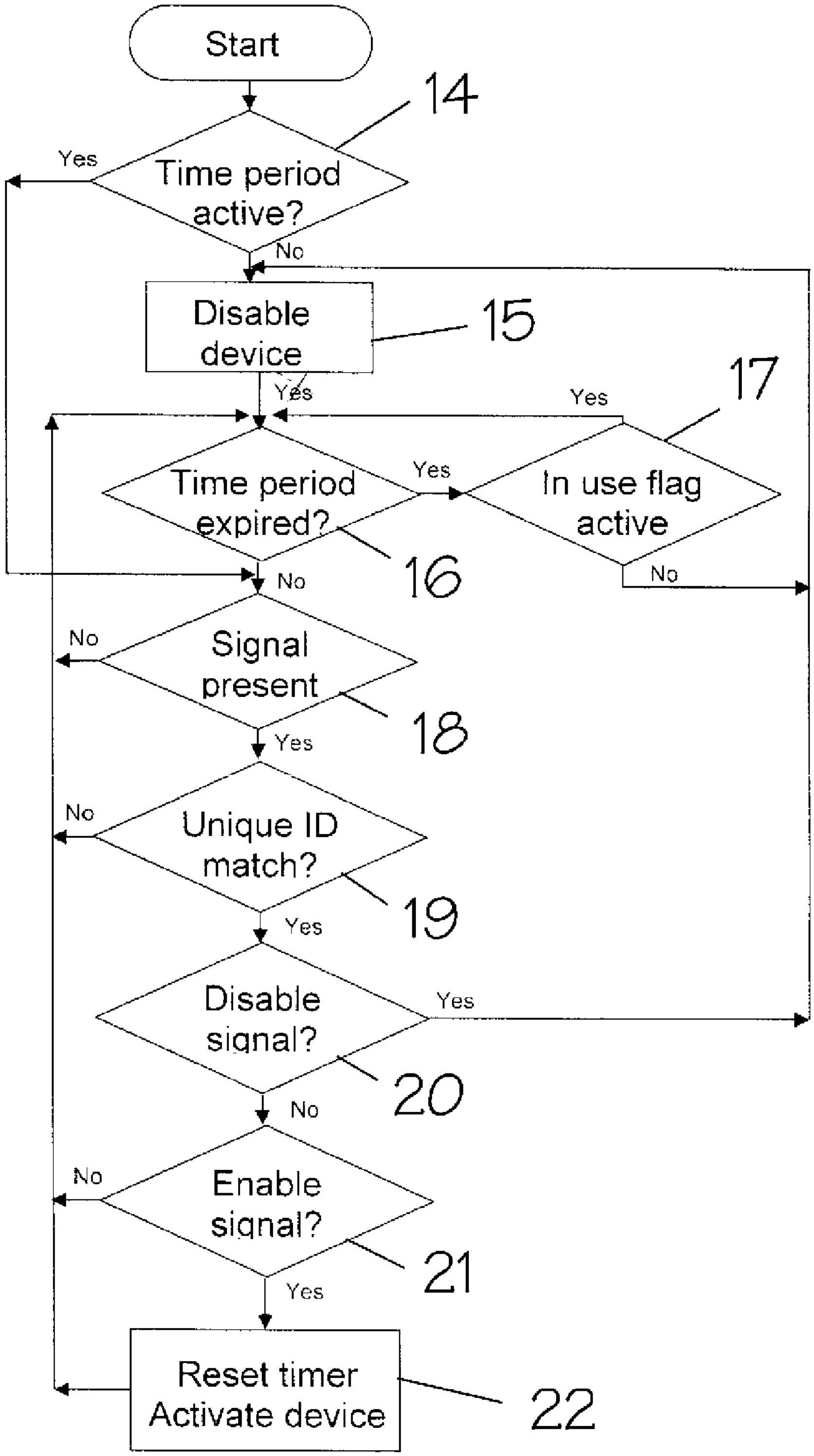
FIG. 2 is flow diagram illustrating the steps performed in a certain presently preferred embodiment of the method of this invention.

FIG. 2 shows the process that occurs within tool 2 during operation of the device shown in FIG. 1. When tool 2 first receives power by, for example, being connected to a battery or AC outlet, the control system determines whether a time period is active (block 14). The existence of a valid time period indicates that the tool had been activated before power was lost, perhaps due to changing a battery or a disconnection.

If there is no active time period (block 14), the tool will be disabled (block 15), to ensure its inoperability. But if a time period is already active (block 14), the control system proceeds to check to see if a wireless signal is present (block 18). If a wireless signal is detected (block 18), the control circuit determines whether the wireless signal transmitted by the electronic key contains the unique identification code 8 which matches the tool's identification code (block 19). If a match is found, the control circuit determines whether a disable signal is present (block 20). If so, the device is disabled (block 15). If there is no identification code match (block 19), the control transfers to where the time period is checked to see if it is still valid (block 16). If a disable signal is not present (block 20), an analysis is performed to determine whether an enable signal is present (block 21). If an enable signal (block 20), is present, the timer is reset, resulting in the activation of the tool (block 22).

If neither a disable signal (block 20), nor an enable signal (block 19), is present, a check is made to determine whether the time period has expired (block 16). If the time period has expired (block 16), an analysis is made to see if the in-use flag (block 17), is active. The in-use flag determines if the device is performing a function that should not be stopped. Device activation is delayed until the in-use flag is no longer active.

Figure 3:
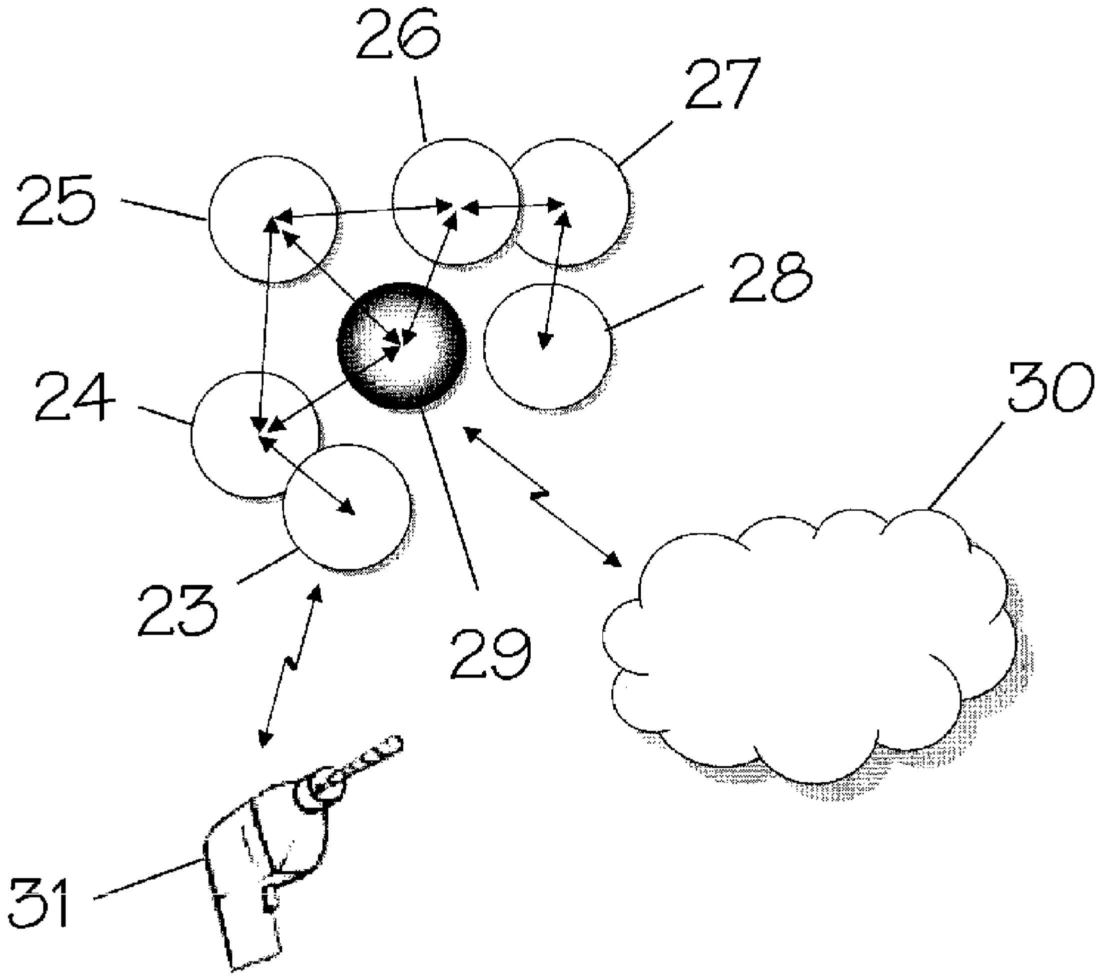
FIG. 3 is an illustration of a typical mesh network.

In FIG. 3, a mesh network has a variety of wireless access points 23, 24, 25, 26, 27, and 28 that are able to communicate among themselves. Some, but not all wireless access points have a connection to a network access point 29. The network access point 29 has access to a network, such as the internet 30. This architecture permits network access to systems that would not normally have network access.

A tool 31, which has the means of communicating with a wireless network, could have its operation reprogrammed, security code changed, and location identified. Location identification is possible as each wireless access point 23, 24, 25, 26, 27, and 28 knows its physical location and can determine the general location of the transmitting device by using a variety of currently known frequency analysis and positioning techniques.

Figure 4:
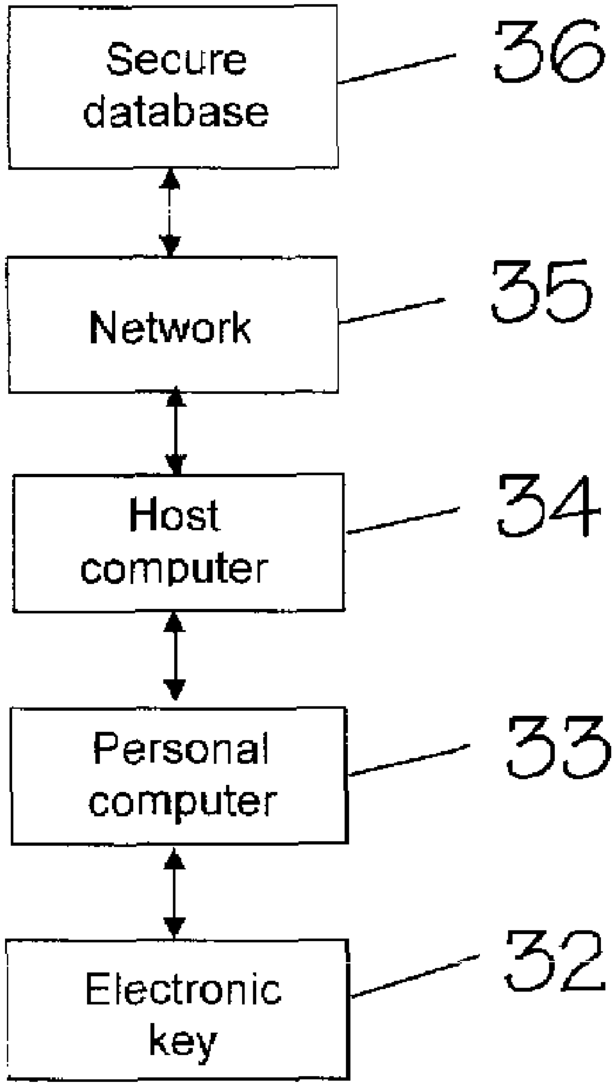
FIG. 4 is a flow diagram illustrating a process for modifying an electronic key according to this invention.

FIG. 4 is a flow diagram for a process for modifying the electronic key. The electronic key is capable of being reprogrammed in order to control additional tools or change the operation of any tool, such as the time of activation or duration of activation.

Electronic key 32 is attached to a personal computer (PC) 33 by either wired or wireless means. PC 33 has a connection to a service provider's host computer 34 in order to communicate with the network. The PC 33 also runs a program that permits an authorized user to log in to remote secure database 36 via network connection 35, such as the internet. The PC program and its connection to secure database 36 provide the means of allowing the authorized user to make the needed changes to electronic key 32.

A manufacturer may want to offer the user the opportunity to combine a number of electronic keys 3 into a single physical key. This may be desirable by users who purchase a variety of devices utilizing the control function described herein. If a manufacturer so desired, a user could contact the manufacturer and provide appropriate proof of ownership, such as the serial number for all of the devices he owns. The manufacturer could send him a single electronic key 3 or multiple electronic keys 3 that would work with all of his devices. The authorized user could make the needed changes himself by accessing the secure database and reprogramming the electronic key or the device himself.

What is claimed is:

1. A system comprising (I) an electronic key that transmits a wireless coded signal; and (II) at least one tool that comprises (A) a first switch that enables the user of said tool to turn the tool on and off;

(B) a second switch in series with said first switch;

(C) a timer that opens said second switch after a predetermined amount of time; and (D) a receiver that receives said wireless coded signal, compares the wireless coded signal to a coded signal stored in said tool and, if the wireless coded signal matches the coded signal being stored, the receiver closes said second switch;

wherein the tool includes at least a storage for storing a unique identifier and the tool is configured for performing a method including at least (i) when the tool is initially powered, a determination is made whether the predetermined amount of time has expired;

(ii) if the predetermined amount of time has expired, the tool is disabled;

(iii) if the predetermined amount of time has not expired, a determination is made whether the coded wireless signal is present;

(iv) if the wireless coded signal is detected to be present, a determination is made whether the wireless coded signal contains a unique identification code by at least checking whether the wireless coded signal matches a signal stored in a storage in the tool;

(v) if a match is found, a determination is made whether a disable signal is present;

(vi) if the disable signal is present, the tool disables itself;

(vii) if no match is found, a determination is made whether the predetermined amount of time has expired;

(viii) if a disable signal is not present, a determination is made whether an enable signal is present;

(ix) if an enable signal is present, the timer is reset, causing the tool to be activated;

(x) if neither a disable signal nor an enable signal is present, a determination is made to determine whether the predetermined amount of time has expired;

(xi) if the predetermined amount of time has expired, a determination is made whether an in-use flag is active, wherein an active in-use flag indicates that the tool is currently performing a function that should not be stopped; and (xii) if the in-use flag is active, deactivation of the tool is delayed until the in-use flag is no longer active.

2. A system according to claim 1 wherein said first switch turns on an electric motor.

3. A system according to claim 1 wherein said first switch turns on a gasoline engine.

4. A system according to claim 1 wherein said first switch activates an electronic circuit.

5. A system according to claim 1 wherein said tool includes a light source that indicates when said second switch is closed.

6. A system according to claim 1 wherein said system comprises at least two separate tools.

7. A system according to claim 1 wherein the electronic key includes at least a network connection for controlling said electronic key.

8. A system according to claim 7 wherein the electronic key includes at least a network connection via which said electronic key communicates over network topologies.

9. A system according to claim 1 wherein said timer opens said second switch after a predetermined amount of time only if first switch is off.

10. A system according to claim 1 wherein said signal from said electronic key resets said timer.

11. A system according to claim 1 wherein said tool includes a unique identification code that is readable by an authorized identification reader.

12. A system according to claim 1 wherein said tool includes a unique identification code that is readable by a wireless network.

13. A system according to claim 1 wherein said tool includes a unique identification code that is readable by a wired communication channel.

14. A system according to claim 1 wherein said tool includes a unique identification code that is readable by an optical communications channel.

15. A system according to claim 1 further comprising an identification reader, wherein said identification reader is in an auxiliary device that is for accessing the unique identification code via a network.

16. A system according to claim 1 wherein said second switch remains closed for said predetermined amount of time when power to said tool is removed.

17. A system according to claim 1 wherein said electronic key includes at least a transmitter via which the electronic key transmits a wireless coded signal to said tool that opens said second switch.

18. A system according to claim 1 wherein said tool includes a unique identification code that is readable by an infrared communications channel.

19. The system of claim 1, further comprising a machine readable medium storing a program that is for causing a computer to run a program for an authorized user to login to a remote secure database associated with the tool via a network connection.

20. The system of claim 1, wherein the tool further comprises:

an electronic combination lock for entering a combination for accessing the tool, wherein the tool may be accessed by either the remote electronic key or the electronic combination lock, and a visual indication of an entry into the electronic combination lock.

21. The system of claim 20, wherein the electronic combination lock includes at least a series of switches for entering the combination.

22. A system comprising:

(I) a remote electronic key that is for wirelessly communicating with a tool, wherein the remote electronic key (A) is for transmitting (1) a first unique identification code to the tool for gaining access to the tool, (2) a second unique identification code to the tool for storage and identification of ownership of the tool, (3) a signal to place the tool in a programmable mode, and (4) a signal to terminate the programmable mode, (B) includes at least a connection, for the electronic key to communicate with a computer, (C) is for being reprogrammed in order to control additional tools, and (D) is for being reprogrammed in order to change an operation of the tool;

(II)a tool that includes at least (A) a power source, (B) an on/off switch that enables an operator of the tool to turn the tool on and off;

(C) a locking switch in series with the on/off switch, wherein the on/off switch causes the tool to turn on only if the locking switch is in an on state;

(D) a transceiver that is for sending and receiving a coded wireless signal to and from the remote electronic key, wherein the transceiver is for receiving the first unique identification code and the second unique identification code from the remote electronic key;

(E) a control circuit that compares the coded wireless signal received from the remote electronic key to a coded signal stored within the tool, wherein the coded signal stored is associated with the first unique identification code, wherein if the coded wireless signal received matches the coded signal stored, the locking switch is set to an on state, wherein the control circuit has a programmable mode that expires after a first time period or after receiving the signal to terminate the programmable mode (1) wherein the control circuit includes at least (a) storage for storing at least (i) the coded signal associated with the first unique identifier for gaining access to the tool, and (ii) another signal associated with the second unique identifier for identifying ownership of the tool, and (b) a timer that is activated for a second time period if the coded wireless signal matches the signal stored, wherein (i) the timer is settable such that at a start of a third time period prior to an end of the second time period the indicator indicates that the second time period will expire soon, and (ii) the timer is for being reset to allow the second time period to be extended, (2) wherein at an expiration of the time period the tool is not deactivated as long as the on/off switch is held in the on position by the operator, (3) the control circuit is configured for performing a method including at least (i) when the tool is initially powered, the control circuit determines whether the second time period expired, (ii) if the second time period expired, the tool is disabled, (iii) if second time period did not expire, the control circuit proceeds to determine if the coded wireless signal is present, (iv) if the coded wireless signal is detected to be present, the control circuit determines whether the coded wireless signal contains the first unique identification code by at least checking whether the coded wireless signal matches the coded signal stored in the storage, (v) if a match is found, the control circuit determines whether a disable signal is present, (vi) if a disable signal is present, the control circuit disables the tool, (vii) if no match is found, the second time period is checked to determine whether the second time period expired, (viii) if the disable signal is not present, an analysis is performed to determine whether an enable signal is present, (ix) if an enable signal is present, the timer is reset, causing the tool to be activated, (x) if neither a disable signal nor an enable signal is present, a determination is made to determine whether the second time period has expired, (xi) if the first time period has expired, an analysis is made to determine whether an in-use flag is active, wherein an active in-use flag indicate that the tool is currently performing a function that should not be stopped, and (xii) if the in-use flag is active, deactivation of the tool is delayed until the in-use flag is no longer active, (F) an indicator that gives an indication (1) when the first time period begins, (2) when the second time period begins, and (3) when the first time period ends, (G) an application power control, which when in an on state, permits the operator to control the tool via the on/off switch until the predetermined amount of time has expired when the power control is switched to an off state;

(H) an actuator that turns on the application power control, (I) an electronic combination for entering a combination for accessing the tool, wherein the tool may be accessed by either the remote electronic key or the electronic combination, and (J) a visual indication of an entry into the electronic combination;

(III) a handheld device that is for (A) interrogating the tool to find out the second unique identifier, and (B) locating the tool based on the second unique identifier; and (IV) a mesh network including at least (A) the tool, and (B) a plurality of wireless access points that are able to communicate with the tool and each other, and (C) at least one wireless access point that does not have a connection to a network access point wherein the network access point has access to another network, wherein the at least one wireless access point that does not have a network connection connects to the other network through the network access point, wherein the tool is for communicating with the mesh network, via which the tool allows the tool's operations to be reprogrammed, a security code to be changed, and location of the tool to be identified; and (V) a machine readable medium storing a program that is for causing a computer to run the program, wherein the program allows an authorized user to login to a remote secure database via the network connection.

23. A method of remotely locking and unlocking a tool from an electronic key comprising:

(A) storing a coded signal in said tool;

(B) sending a wireless coded signal from said electronic key to said tool;

(C) comparing said coded signal that was sent to said coded signal that was stored;

(D) if said coded signal that was sent is identical to said stored coded signal that was stored, unlocking said tool for a predetermined period of time;

(B) after said predetermined amount of time, locking said tool; and, (F) determining whether to delay performing (E) by at least, if the time period has expired, performing an analysis to determine if an in-use flag is active, wherein an active in-use flag indicates that the tool is currently performing a function that should not be stopped, and if the in-use flag is active, delaying a deactivation of the tool until the in-use flag is no longer active.

24. A method of operating a device according to claim 23 comprising (A) closing said second switch by transmitting a wireless coded signal from said electronic key to said tool; and (B) closing said first switch.

25. A method according to claim 23 wherein step (E) is delayed if said tool is being used.

26. A method according to claim 23 wherein step (E) is delayed if said predetermined amount of time is extended by a second coded signal from said electronic key.

* * * * *